Nov. 8, 1966 JEAN-JACQUES LAUPRETRE 3,284,638

INVERTING STORAGE CIRCUIT

Filed Jan. 23, 1963 2 Sheets-Sheet 2

3,284,638

INVERTING STORAGE CIRCUIT

Jean-Jacques Laupretre, Le Perreux sur Marne, France, assignor to Compagnie des Machines Bull (Société Anonyme), Paris, France Filed Jan. 23, 1963, Ser. No. 253,398
Claims priority, application France, Jan. 30, 1962, 886,360
6 Claims. (Cl. 307—88.5)

Figure 1:
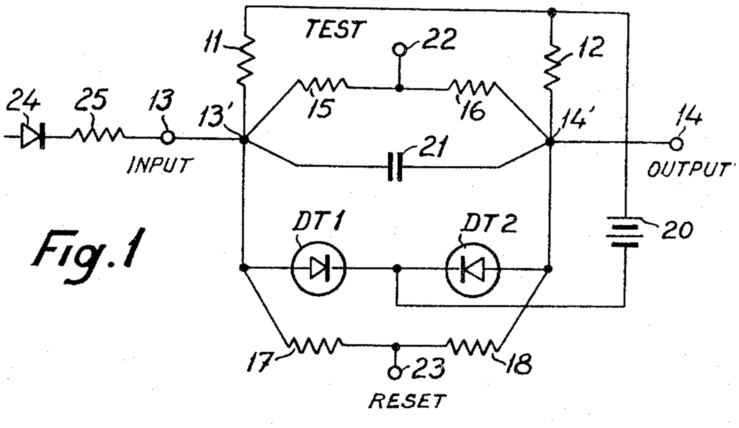

The present invention relates to logical circuits employed in data-processing apparatus, and is concerned more especially with a device for carrying out the functions of inversion and storage.

Hitherto, it has been easy to obtain an electronic device which acts both as a storage device and as an inverter, in the form of a bistable flip-flop comprising electron tubes or transistors.

However, it is now found that there is a requirement for logical elements admitting of pulse frequencies well above one megacycle per second, which gives rise to very difficult problems. Another tendency is found towards miniaturisation and compaction of the functional members. This is why the use of electron tubes is being abandoned. On the other hand, the majority of the existing transistors are incapable of ensuring very high-frequency pulse operation, or the special transistors are too costly.

The invention makes use of the existence of a new semi-conductor device which has a negative resistance characteristic and which is known as the "tunnel" diode (or the Esaki diode). This diode can be extremely rapidly commutated and can be obtained at reasonable cost.

A tunnel diode has a voltage/current curve which begins in the forward direction by a rising or positive resistance portion, which is followed by a descending or negative-resistance portion, which is in turn followed by a rising or positive-resistance portion. By reason of the shape of this curve, the tunnel diode associated with a current source constitutes a bistable device which is inexpensive and of low bulk.

The invention has for its object to provide a device which is capable of effecting the logical inversion of a binary datum when it has registered it. In fact, the inversion is effected only during, and under the control of, a subsequent pulse at an instant when the inverted datum is retransmitted from an output terminal of the device.

Hence, there is provided in accordance with the invention a logical device for performing the function of inverting a binary datum with storage or retardation, which device comprises a first bistable device and a second bistable device, each including a semi-conductor diode having negative resistance and a substantially constant current source, the cathodes of the two diodes being connected to a reference potential point, and resistive members for the application of a test pulse to the anodes of the two diodes, as also a condenser connected between the anodes of the two diodes.

The current source of the first bistable device is adapted to enable the latter to function as an OR circuit, i.e. it changes from the state "0" to the states "1" at the reception of a current increment. The current source of the second bistable device is adapted to enable the latter to operate as an AND circuit, that is to say, it changes from the state "0" to the state "1" only if it simultaneously receives two current increments.

Figure 4:
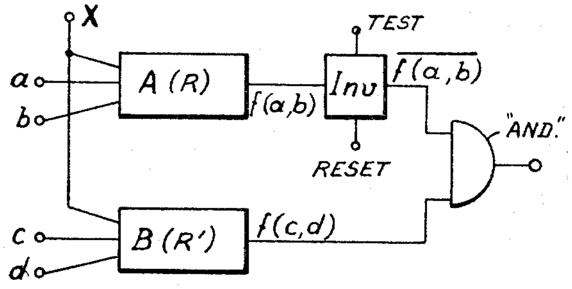
Figure 5:
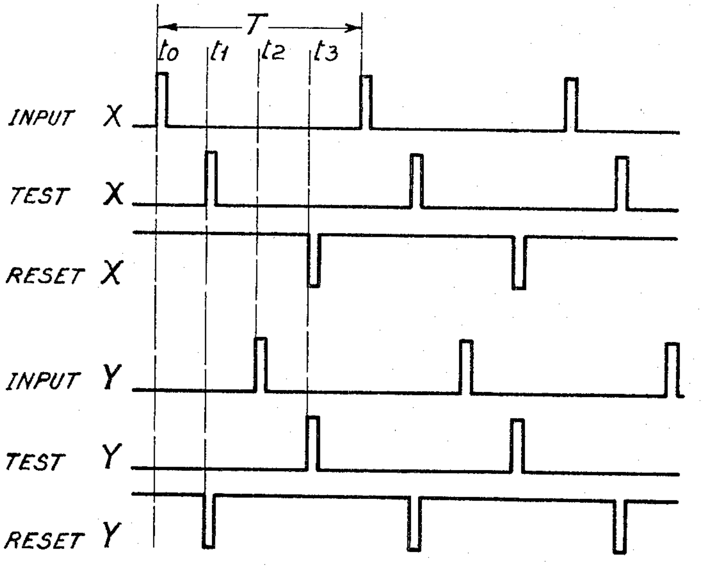
Figure 2:
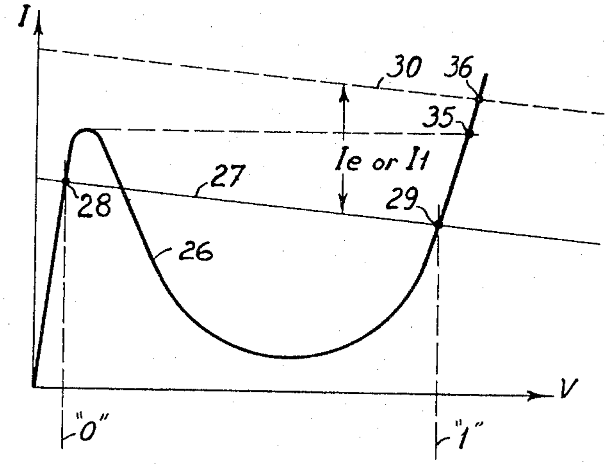
Figure 3:
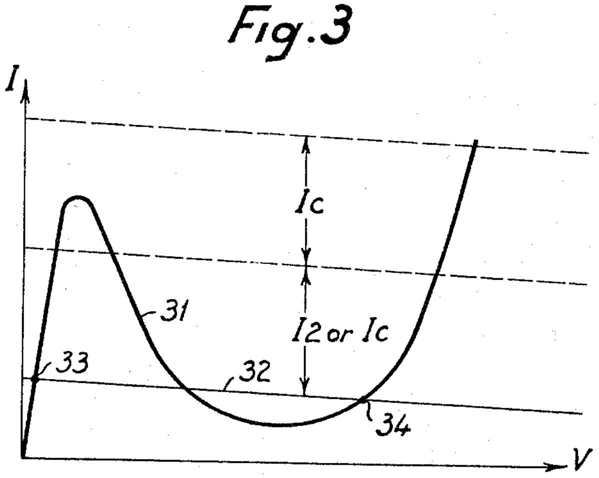

Further features of the invention will become apparent from the following description with reference to the accompanying drawings, in which:

FIGURE 1 is an electric circuit diagram of the inverting circuit according to the invention, FIGURES 2 and 3 are characteristic curves explaining the operation, FIGURE 4 is the basic circuit diagram of a logical assembly in which the invention may be incorporated, and FIGURE 5 is a graphic representation of pulse trains applicable to a plurality of logical assemblies.

There may be required in an information-processing apparatus a logical assembly such as that illustrated in the form of a basic circuit diagram in FIGURE 4. A and B are any two logical operators. Each is composed of elemental logical circuits succeeded by a storage element, which may be a circuit having two stable states or a flip-flop. Usually, it may be stated that the binary value "1" is available when the voltage level at a particular output terminal of the flip-flop is high or positive, and that the zero binary value exists when the said level is at zero potential or at earth potential, for example.

Each operator is illustrated by way of example as having two inputs to receive the data $a$, $b$ and $c$, $d$ respectively, as also a control or sampling input for receiving a pulse X supplied by a synchronising generator or the like. The indications R and R′ are given here to indicate the transmission or delay times peculiar to the two logical operators. Such a delay time is that which separates the instant of application of the pulse X and the instant when the response signal is set up at the output of each operator. It is found in practice that the delay times R and R′ are rarely equal. When the pulse repetition frequency is very high, it would be very costly to make the said respective delay times strictly equal.

The device marked "Inv." is an inverting device intended to supply at its output the function $\overline{f(a, b)}$ when it has received at its input the function $f(a, b)$. It may be assumed that its transmission delay is negligible.

The output of the logical operator B and the output of the inverting device Inv. are each connected to an input of a logical AND circuit. It may happen that a faulty operation occurs when the delay time R′ is shorter than the delay time R.

There will now be considered what happens in such a case starting from the instant to, when the pulse X is applied to both operators A and B. The case where the output of B supplies $f(c, d)=0$ may be disregarded from the outset, because the lower input of the AND circuit receives nothing.

The case will now be considered where the output of B changes from 0 to 1 at the instant to +R′. If the output of A is $f(a, b)=0$, the output level of the inverter is $\overline{f(a, b)}=1$, or high level, and the information is correctly transmitted to the two inputs of the AND circuit.

On the other hand, if the output of A is $f(a, b)=1$, the output of the inverter Inv. gives $\overline{f(a, b)}=0$ only at the instant to +R. During the interval of time $R-R'$, the outputs of Inv. and B are both at the level 1, and in this case the information applied to the inputs of the AND circuit is momentarily erroneous.

In order to avoid this cause of error, a logical inverting device has been designed which is endowed with storage properties and which is adapted thereafter to transmit the registered information, this transmission being effective only after occurrence of a test or transfer pulse.

The inverting device will be considered in detail with reference to FIGURE 1.

The inverting and storing device comprises essentially two negative-resistance diodes DT1 and DT2, also called tunnel diodes. A load resistance 11 is connected between the anode of the diode DT1 and the positive pole of a voltage source 20, and a load resistance 12 is connected to the anode of the diode DT2 and the positive pole of the voltage source 20, symbolically represented as a battery.

From the electrical viewpoint, junction point 13' represents the connection of input terminal 13 to the anode of the diode DT1, a plate of a condenser 21 and one end of the resistances 11, 15 and 17. Likewise, junction point 14' represents the connection of output terminal 14 to the anode of the diode DT2, the other plate of the condenser 21, and one end of the resistances 12, 16 and 18. The cathode of each of the diodes DT1 and DT2 is connected to the negative pole of the voltage source 20, this pole supplying a zero or reference potential with respect to the voltages or pulses otherwise applied to the circuit.

The junction point of the resistances 15, 16 is connected to a terminal 22 intended to receive test pulses. The junction point of the resistances 17, 18 is connected to a terminal 23 intended to receive the pulses for resetting the device.

The diode 24 and the resistance 25, which are shown as being connected to the input terminal 13, may be employed as connecting members for preventing the transmission of spurious pulses from the inverting storage device to the logical operator A of FIGURE 4 for example. For a very high pulse frequency, an ordinary diode is unsuitable and there may be employed a tunnel diode having a degenerate characteristic, which is known as a "backward" diode. On the other hand, the members 24, 25 may be one of the input elements of an OR circuit having a number of inputs, if it is desired to connect the input 13 to the output of such an OR circuit.

In FIGURE 2, the curve 26 represents the current-voltage characteristic curve of the diode DT1. The value of the resistance 11 is so chosen that the load line 27 intersects the curve 26 at three points, the two points of intersection 28 and 29 corresponding to the two stable states of conduction which can be assumed by this circuit branch. The point 28 corresponds to the so-called "low-voltage" stable state, which may be arbitrarily allocated to the binary "zero." The point 29 corresponds to the so-called "high-voltage" stable state, which may be allocated to the binary "1."

In FIGURE 3, the curve 31 represents the characteristic current-voltage curve of the diode DT2, which is as far as possible identical to that of the diode DT1. The value of the resistance 12 is so chosen that the load line 32 intersects the curve 31 also at three points, of which two, 33 and 34, correspond to the two stable states which may be assumed by this circuit branch.

After application of a negative resetting pulse to the terminal 23 (FIGURE 1), the two diodes DT1 and DT2 are brought to their low-voltage or "0" state.

There will now be considered the instant when a voltage variation of positive direction is applied to the terminal 13 representing the transmission of a binary "1" by the logical operator situated on the input side. The additional current resulting therefrom in the diode DT1, and symbolically represented by I*e* in FIGURE 2, is added to the quiescent current. This is equivalent to a vertical shift of the load line to the position of the dashed line 30. The point 28 corresponds to a current slightly lower than the peak current. The diode DT1 is thus changed over to the state "1" and the current flowing through it would thereafter return to the operating point 29 if the input pulse ended prematurely.

The charging current of the condenser 21 flows through the diode DT2. If it is noted that the quiescent current at the point 33 is much smaller than the quiescent current at the point 28, in the case of the diode DT1, it will be appreciated that the charging current I*c* of the condenser is not sufficient for the peak current to be reached. Therefore, when the condenser 21 is completely charged, the operating point returns to 33, which shows that the stable state of the diode DT2 has not been lastingly changed.

After a short period of time, a positive test pulse arrives at the terminal 22. The additional current I1 flowing through the resistance 15 is readily absorbed by DT1 without the potential of the point 13' varying substantially. On the other hand, the current I2 flows through the resistance 16 and the diode DT2, while no substantial voltage change appears across capacitor 21. It will be seen from FIGURE 3 that the additional current I2 is still insufficient for the peak current to be reached. Therefore, the state of the diode DT2 remains substantially unchanged. The inversion function has in fact been obtained since at the instant of the test pulse only one pulse of negligible amplitude is set up at the output terminal 14, the voltage level of which is not ultimately changed.

A little later still, the negative resetting pulse applied to the terminal 23 has the effect of bringing the voltage at the terminals of the diodes DT1 and DT2 to a very low value, which returns DT1 to "0" state.

On the other hand, if the case is considered where the input 13 receives no voltage variation representing a binary "1" before the application of the test pulse, the operation is as follows:

At the time of the application of the test pulse to the terminal 22, the diodes DT1 and DT2 are each in the "0" state. Assuming that the values of the resistances 15 and 16 are equal, the additional currents I1 and I2, which are substantially equal, are supplied to the anodes of the diodes DT1 and DT2. However, owing to the fact that the quiescent current of DT1 is fixed at a higher value than the quiescent current of DT2, it follows that the diode DT1 changes its state at the beginning of the test pulse. The point of operation of the diode DT1 would tend to change suddenly from the top of the peak current to the points 35 and then 36 on the curve 26 of FIGURE 2. However, this sudden voltage change is slowed down by the presence of the condenser 21, which is not yet charged and which will require a temporary charging current. The resulting charge current I*c* (FIGURE 3) is added to the additional current I2, thus causing the change-over of the diode DT2 from the state "0" to the state "1." When the test pulse has ended, the point of operation of DT2 returns to 34.

Immediately after the end of the test pulse, the high voltage level may be transmitted from the output terminal 14 to an input of the succeeding logical circuit, such as that of FIGURE 4. The inverting operation has again been correctly performed, since the said high voltage level represents the binary "1," while the logical operator A had previously supplied the value "0."

It may be suitable by way of precaution to add a resistor of appropriate value which should be connected in series with the condenser 21 between the junction points 13' and 14', in order to ensure unconditional triggering of the diode DT1 despite any unfavourable tolerances existing in the input and output capacitances as seen from the said junction points, or between the peak currents of the two tunnel diodes.

If substantially equivalent current increments (I*e*, I1, I2 or I*c*) are considered, it will be found that the diode DT1 is biased to act as an OR circuit (triggering for one current increment), while the diode DT2 is biased to operate as an AND circuit (triggering only for two simultaneous current increments).

It will now be shown that one of the advantages of the inverting circuit hereinbefore described is that it renders possible a simplification and shortening of the operating cycle of the apparatus in which it is incorporated.

It may be assumed that an information-processing apparatus includes a number of logical assemblies, such as that illustrated in FIGURE 4, which are generally connected in cascade to perform successive logical functions.

These successive logical assemblies may be considered as being divided into stages alternately of odd and even rank. Referring to FIGURE 5, which is suitable for the case where a central clock is provided in the apparatus, there are applied to the stages of odd rank, for example, the pulse trains of phase X, and to the stages of even rank the pulses of phase Y. For each phase X or Y, there are employed an input pulse train, a test pulse train and a reset pulse train, these trains being applied to the appropriate inputs, as has previously been indicated. It may be seen that a cycle period T is divided only into four pulse times. The pulses of phase Y are time-staggered by a half-cycle in relation to the pulses of phase X. It will be seen that a test pulse of phase X occurs at the time *t*1, simultaneously with a reset pulse of phase Y, which results in an intrinsic time gain. At the time *t*3, a reset pulse of phase X and a test pulse of phase Y are also simultaneously present.

The only essential condition to be observed is that the interval of time *t*0—*t*1 (as also *t*2—*t*3) is always longer than the maximum inherent delay time of any logical operator such as A or B of FIGURE 4.

The application of the inverting device just described is not limited to an apparatus comprising a central clock or a unitary synchronising generator. The inverting device may also be incorporated in a so-called asynchronous apparatus, in which there is provided a control (or test) pulse generator localised in, or associated with, one or more logical stages.

While it has been assumed in the foregoing that the information "1" introduced at the input 13 is represented by a positive voltage level maintained until the application of the succeeding test pulse, it is obvious that the operation is in no way disturbed if an input pulse ends before the application of the succeeding test pulse, by reason of the storage function performed by the diode DT1 when it has changed its state of conduction.

I claim:

1. An inverting storage circuit arrangement for direct current signals, comprising:

a first tunnel diode, a second tunnel diode, both diodes admitting substantially equal peak currents and having their cathode connected directly to a common reference potential, a first resistor for connecting the anode of said first diode to a direct current voltage source, a second resistor for connecting the anode of said second diode to said voltage source, said resistors being such as to ensure for both of said diodes a stable "low voltage" operation state and a stable "high voltage" operation state, the current normally flowing during the "low voltage" state through said first diode being substantially greater than that flowing through said second diode, an input terminal connected to the anode of said first diode for receiving an input signal represented by the presence or absence of a positive voltage excursion at a given instant of time, a test terminal for receiving after said given instant of time a positive test pulse, a third resistor for connecting said test terminal to the anode of said first diode, a fourth resistor for connecting said test terminal to the anode of said second diode, and a capacitor connected between the anodes of both of said diodes and whose capacitance is chosen so that, upon receipt of said test pulse, said second diode is prevented to switch to its "high voltage" state if said first diode has been switched to its "high voltage" state by a positive excursion of said input signal at said given instant of time.

2. A circuit arrangement acording to claim 1, further including:

a reset terminal for receiving a reset pulse of positive polarity at any time after said test pulse, a fifth resistor for connecting said reset terminal to the anode of said first tunnel diode, and a sixth resistor for connecting said reset terminal to the anode of said second tunnel diode.

3. A circuit arrangement according to claim 2, wherein a further resistor is series-connected with said capacitor between the anodes of both of said diodes to ensure safe triggering of said first tunnel diode upon receipt of said positive excursion despite differences in the peak current values of both said tunnel diodes.

4. An inverting storage circuit arrangement for direct current signals, comprising:

a first tunnel diode with first and second electrodes, a second tunnel diode with first and second electrodes, both diodes admitting substantially equal peak currents and having their first electrode directly connected to a common reference potential, a first resistor for connecting the second electrode of said first diode to a direct current voltage source, a second resistor for connecting the second electrode of said second diode to a direct current voltage source, said resistors being chosen to ensure for both of said diodes a stable "low voltage" operation state and a stable "high voltage" operation state, the current normally flowing during the "low voltage" state through said first diode being substantially greater than that flowing through said second diode, an input terminal connected to the second electrode of said first diode for receiving an input signal which may be a short pulse of determined polarity at a given instant of time, a test terminal for receiving after said given instant of time a test pulse of the same polarity as that of the eventual input pulse, a third resistor for connecting said test terminal to the second electrode of said first diode, a fourth resistor for connecting said test terminal to the second electrode of said second diode, and a capacitor connected between the second electrodes of both of said diodes and whose capacitance is such that, upon receipt of said test pulse, said second diode is prevented to switch to its "high voltage" state if said first diode has been switched to its "high voltage" state by an input pulse at said given instant of time.

5. A circuit arrangement according to claim 4, further including a reset-terminal for receiving a reset pulse of a polarity opposite to that of said test pulse at any time after said test pulse, a fifth resistor for connecting said reset terminal to the second electrode of said first diode and a sixth resistor for connecting said reset terminal to the second electrode of said second diode.

6. A circuit arrangement according to claim 5, wherein a further resistor is series-connected with said capacitor between the second electrodes of both said tunnel diodes and has a resistance chosen to compensate for the value dispersions of the other components.

References Cited by the Examiner

UNITED STATES PATENTS

| | | | |
|---|---|---|---|
| 2,944,164 | 7/1960 | Odell et al. | 307—88.5 |
| 3,116,426 | 12/1963 | Oshima et al. | 307—88.5 |
| 3,142,768 | 7/1964 | Kaufman | 307—88.5 |
| 3,193,804 | 7/1965 | Perry et al. | 307—88.5 |
| 3,211,921 | 10/1965 | Kaufman et al. | 307—88.5 |
| 3,217,268 | 11/1965 | Hu | 307—88.5 X |

ARTHUR GAUSS, *Primary Examiner.*

J. JORDAN, *Assistant Examiner.*